United States Patent
Lin

(10) Patent No.: US 10,907,071 B2
(45) Date of Patent: Feb. 2, 2021

(54) ORGANOSILANE CONDENSATE COATING COMPOSITION

(75) Inventor: Jun Lin, Troy, MI (US)

(73) Assignee: AXALTA COATING SYSTEMS IP CO. LLC, Wilmington, DE (US)

( * ) Notice: Subject to any disclaimer, the term of this patent is extended or adjusted under 35 U.S.C. 154(b) by 439 days.

(21) Appl. No.: 13/499,993

(22) PCT Filed: Oct. 5, 2010

(86) PCT No.: PCT/US2010/051428
§ 371 (c)(1),
(2), (4) Date: Apr. 3, 2012

(87) PCT Pub. No.: WO2011/046773
PCT Pub. Date: Apr. 21, 2011

(65) Prior Publication Data
US 2012/0208029 A1 Aug. 16, 2012

Related U.S. Application Data

(60) Provisional application No. 61/251,006, filed on Oct. 13, 2009.

(51) Int. Cl.
C09D 183/08 (2006.01)
C08G 77/26 (2006.01)
C08K 5/544 (2006.01)

(52) U.S. Cl.
CPC .......... C09D 183/08 (2013.01); C08G 77/26 (2013.01); C08K 5/544 (2013.01); *Y10T 428/31511* (2015.04); *Y10T 428/31663* (2015.04)

(58) Field of Classification Search
None
See application file for complete search history.

(56) References Cited

U.S. PATENT DOCUMENTS

| | | | |
|---|---|---|---|
| 5,580,819 A * | 12/1996 | Li et al. | 427/167 |
| 6,432,191 B2 * | 8/2002 | Schutt | 106/287.13 |
| 6,610,872 B1 * | 8/2003 | Choi et al. | 556/53 |
| 6,921,578 B2 * | 7/2005 | Tsujino et al. | 428/428 |
| 2002/0077420 A1 * | 6/2002 | Chiba | C08L 23/10 525/89 |
| 2003/0073779 A1 * | 4/2003 | Tamori et al. | 524/588 |
| 2003/0129740 A1 * | 7/2003 | Seo | C03C 17/30 435/287.2 |
| 2005/0074617 A1 * | 4/2005 | Lin et al. | 428/447 |
| 2007/0078250 A1 * | 4/2007 | Ackermann | 528/10 |
| 2009/0186975 A1 * | 7/2009 | Schaal et al. | 524/437 |
| 2011/0039115 A1 * | 2/2011 | Domes et al. | 428/447 |
| 2011/0143130 A1 * | 6/2011 | Endo et al. | 428/336 |

FOREIGN PATENT DOCUMENTS

| | | | | |
|---|---|---|---|---|
| AU | 2006237998 A1 * | 10/2006 | | C09D 5/08 |
| EP | 0638605 A1 * | 2/1995 | | C08G 63/6954 |
| FR | 2741626 A1 * | 5/1997 | | |
| JP | 56125462 A * | 10/1981 | | |
| JP | 56125464 A | 10/1981 | | |
| JP | 2007177314 A * | 7/2007 | | |

OTHER PUBLICATIONS

English Abstract of JP 56125462 (1981).*
English machine translation of FR 2741626 A1 from EPO espacenet.com.*
Reaction of (3-Aminopropyl)dimethylethoxysilane with Amine Catalysts on Silica Surfaces, White, JI of Colloid and Interface Science, 232, 400-407 (2000).*
English abstract JP 56125464 (1981).*
Principles of the Manufacturing of Composite Materials, Hoa, p. 66 (2009).*
English machine translation of JP2007-177314 (2007).*

* cited by examiner

Primary Examiner — Kenneth J Stachel
(74) Attorney, Agent, or Firm — Lorenz & Kopf, LLP

(57) ABSTRACT

Organosilane condensates are described as well as their use in coating compositions, processes for making them and process for applying the coating compositions. The organosilane condensates can be formed from the hydrolysis of at least one medium to long chain trialkoxy silane compound, an amino silane and optionally one or more additional reactants. Coating compositions containing the organosilane condensates can provide coatings having improved scratch and mar resistance and can have excellent recoat adhesion.

6 Claims, No Drawings

ORGANOSILANE CONDENSATE COATING COMPOSITION

This application is a U.S. National-Stage entry under 35 U.S.C. § 371 based on International Application No. PCT/US2010/51428, filed Oct. 5, 2010, which claims priority from U.S. Provisional Application Ser. No. 61/251,006 filed on Oct. 13, 2009.

FIELD OF THE DISCLOSURE

This disclosure is related to organosilane condensates and their use in coatings compositions. Also disclosed herein are methods for using the organosilane condensates, coating composition containing the organosilane condensates and substrates coated by a coating composition comprising the organosilane condensates.

DESCRIPTION OF THE RELATED ART

The field of nanoparticles is a relatively new and growing area to the coatings industry. Nanoparticle materials are being utilized in many commercial coating applications and the benefits that they bring provide an increase in many important properties.

In the coatings industry, silica nanoparticles are one of the most important nanoscale materials and are commercially available in at least two different forms. Fumed silica is silicon dioxide that tends to become arranged in a chain-like structure. The manufacture of fumed silica is via the burning of silica tetrachloride in a hydrogen and oxygen flame. The chain-like structures are due to the agglomeration of the molten spheres of silicon dioxide. Colloidal silica is a water- or solvent-based dispersion of essentially spherical particles of silicon dioxide. Colloidal silica can be produced by several methods and is generally 3 to 7 times more expensive than fumed silica.

The addition of silica nanoparticles to coatings, especially to clearcoats, can provide an improvement in the scratch and mar resistance of the cured coating. Both fumed and colloidal silica can be used. Colloidal silica, having a high level of silanol groups on the surface, is more receptive to post treatment processes, which allows it to be dispersed into a coating composition more easily. If the colloidal silica is properly prepared, it can show improved jetness (color intensity) and better appearance than fumed silica, due to less agglomeration. However, colloidal silica tends to produce excessively high wear on circulation pumps and the price of colloidal silica can be prohibitive to its use in coatings.

Therefore, there is a continuing need for coatings that offer high scratch and mar resistance, incorporate easily into coating compositions and do not cause wear issue for the circulation pumps used to apply the material to a substrate.

SUMMARY OF THE DISCLOSURE

The present disclosure relates to a coating composition comprising A) an organosilane condensate; and B) a film-forming binder, substrates coated by the coating compositions and methods for producing a coating composition comprising the organosilane condensates. The disclosure further provides for process to form the organosilane condensate.

The coating compositions containing the organosilane condensates provide clearcoats that have excellent scratch and mar resistance.

DETAILED DESCRIPTION

As used herein, the phrase "organosilane condensate" or "silane condensate" means a silicon containing material formed according to procedures described herein. The organosilane condensate can comprise a variety of structures depending upon the components incorporated into the condensate, and can range from structures having a number average molecular weight of less than 1000 to particles having an average particle size in the range of from 1 nanometer (nm) to greater 6 microns as measured by light scattering. In general, the described hydrolysis methods result in a product having a mixture of products within the ranges above. One of ordinary skill in the art can modify the reaction conditions to favor lower molecular weight products or to favor larger organosilane condensates.

As used herein, the term "hydrolysis reaction" or "hydrolysis" means that a mixture comprising or consisting essentially of the components (described later) are reacted in the presence of water, and wherein water reacts with at least one of the components to break existing covalent bonds and form new bonds. Optionally, an acid catalyst may be present during the reaction.

As used herein, the phrase "amino silane" means a non-polymeric compound containing at least one primary, secondary or tertiary amine, and at least one active silane group.

As used herein, "active silane group" means a moiety having a silicon atom and, attached directly to the silicon atom, at least one hydrolysable group, such as: for example, an alkoxy group or a hydroxyl group. In some embodiments, the active silane group can be a trialkoxy silane group.

As used herein, the term 'substrate' means any surface made of materials such as metal, wood, resin, asphalt, leather, paper, woven and nonwoven fabrics, cement, plaster or any other surface, whether or not the surface was previously coated with one or more coating composition. Previous coatings include, but are not limited to electrodeposition primer, a primer, a primer/sealer, or a pigmented coating.

It should be noted that clearcoat refers to the state of the dried and cured coating. It is possible that a clearcoat composition can be a milky, transparent, opaque or translucent solution, mixture, or dispersion. Also, clearcoat compositions as described herein can optionally have a small amount of pigment present in order to tint the clearcoat composition.

The features and advantages of the present disclosure will be more readily understood, by those of ordinary skill in the art, from reading the following detailed description. It is to be appreciated that certain features of the disclosure, which are, clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges.

Also, the disclosure of these ranges is intended as a continuous range including every value between the minimum and maximum values.

One embodiment of the following disclosure relates to a coating composition comprising A) a organosilane condensate; and B) a film forming binder. The coating composition can be useful as a clearcoat composition and provides a layer of a dried and cured coating composition that can provide excellent scratch and mar resistance. In addition, the coating compositions described herein can also provide a substrate that adheres well to a subsequently applied layer of a coating composition, such as, for example, a layer of a coating applied during the repair of damaged portions.

Organosilane Condensate

The organosilane condensate can be formed from several hydrolysis methods as will be discussed below. In each of the embodiments of the hydrolysis, the hydrolysis is done in the presence of water and optionally, an acid catalyst can be added to the reaction to help accelerate the hydrolysis. Solvents are also optional.

In some embodiments, the organosilane condensate can be formed by the hydrolysis of at least one medium to long chain trialkoxy silane and an amino silane. In some embodiments, the amino silane can be used in an amount ranging from 0.03 percent to 1 percent by weight, wherein the percentage by weight is based on the total amount of medium to long chain trialkoxy silane.

As used herein, the term "medium to long chain trialkoxy silane" means a compound having a structure according to formula (1):

wherein each R is independently an alkyl group having from 1 to 4 carbon atoms; and $R^1$ is selected from an unsubstituted alkyl group having 3 to 20 carbon atoms, an organic group having 3 to 20 carbon atoms substituted with one or more functional groups, such as, for example, epoxide, carbamate, urea, isocyanate, hydroxyl, vinyl, blocked isocyanate or a combination thereof. The addition of such functional groups can help to provide a crosslinkable group so that the organosilane condensate can form a part of the final crosslinked network, it can help to provide recoat adhesion, and it can provide functionality for further chemical reactions. Suitable examples of medium to long chain trialkoxy silanes wherein $R^1$ is substituted with one or more functional groups are represented by structures (2) and (3):

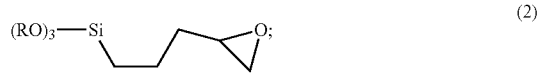

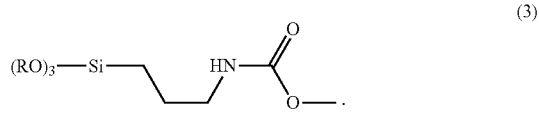

In some embodiments, the medium to long chain trialkoxy silane can be propyl trimethoxy silane, propyl triethoxy silane, isopropyl trimethoxy silane, isopropyl triethoxy silane, 1-butyl trimethoxy silane, 1-butyl triethoxy silane, 2-butyl trimethoxy silane, 2-butyl triethoxy silane, isobutyl trimethoxy silane, isobutyl triethoxy silane, t-butyl trimethoxy silane, t-butyl triethoxy silane, 1-pentyl trimethoxy silane, 1-pentyl triethoxy silane, isomers of pentyl trimethoxy silane, isomers of pentyl triethoxy silane, 1-hexyl trimethoxy silane, 1-hexyl triethoxy silane, isomers of hexyl trimethoxy silane, isomers of hexyl triethoxy silane, octyl trimethoxy silane, octyl triethoxy silane, decyl trimethoxysilane, decyl triethoxysilane, 3-glycidoxypropyltrimethoxylsilane or a combination thereof.

In some embodiments, the process for forming the organosilane condensate comprises;
 a) forming a reaction mixture comprising or consisting essentially of at least one medium to long chain trialkoxy silane and water;
 b) stirring the reaction mixture;
 c) adding to the reaction mixture at least one amino silane; and
 d) stirring the reaction mixture until the desired organosilane condensate is formed.

In some embodiments of the process, the hydrolysis reaction can be performed at ambient temperatures and in other embodiments, the hydrolysis reaction can be performed at elevated temperatures, up to the reflux temperature of the reaction mixture. In other embodiments, the hydrolysis reaction can be performed at temperatures, in the range of from 30° C. to 90° C. In still further embodiments, the hydrolysis reaction can be performed at temperatures in the range of from 40° C. to 80° C. The length of time for the reaction can vary from several minutes to 24 hours or more.

In other embodiments of the above described process, the reaction mixture can further comprise one or more additional reactants. In still further embodiments of the process, the reaction mixture can consist essentially of at least one medium to long chain trialkoxy silane, water and one or more additional reactants. Each of these additional reactants will be described in terms of separate embodiments, however, combinations of the additional reactants can also be used to form the reaction mixture.

In some embodiments, the reaction mixture can comprise or consist essentially of at least two medium to long chain trialkoxy silanes and water. The at least two medium to long chain trialkoxy silanes can comprise or consist essentially of at least one medium to long chain trialkoxy silane, wherein $R^1$ is an unsubstituted alkyl group having 3 to 20 carbon atoms; and at least one medium to long chain trialkoxy silane wherein $R^1$ is substituted with a functional group, such as, for example, wherein $R^1$ is substituted with an epoxy or a carbamate group, as in structures (2) or (3).

If substituted $R^1$ groups are present, the ratio of substituted to unsubstituted $R^1$ can vary. Suitable organosilane condensates can be produced when 100% of the medium to long chain trialkoxy silane includes one or more functional groups. Other suitable organosilane condensates can be produced when the weight ratio of substituted $R^1$ to unsubstituted $R^1$ is in the range of from 0.01:100 to greater than 100:0.01.

In other embodiments, the reaction mixture can comprise or consist essentially of at least one medium to long chain trialkoxy silane, at least one di-alkoxy or mono-alkoxy silane and water. Suitable di-alkoxy or mono-alkoxy silanes can have a structure according to formula (4);

wherein each R is independently an alkyl group having from 1 to 4 carbon atoms; and $R^1$ is selected from an unsubstituted alkyl group having 3 to 20 carbon atoms, an organic group having 3 to 20 carbon atoms substituted with one or more functional groups, such as, for example, epoxide, carbamate, urea, isocyanate, hydroxyl, vinyl, blocked isocyanate or a combination thereof; and n is equal to 1 or 2. Specific dialkoxy or monoalkoxy silanes can include, for example, 3-glycidoxypropyldimethoxymethylsilane, 3-glycidoxypropylmethoxydimethylsilane.

In other embodiments, the reaction mixture can comprise or consist essentially of at least one medium to long chain trialkoxy silane, tetraalkyl orthosilicate and water. The tetraalkyl orthosilicate can be present in the reaction mixture in a medium to long chain trialkoxy silane:tetraalkyl orthosilicate weight ratio in the range of from 1:0.01 up to about 1:20 or higher. It is known that, under certain conditions, the hydrolysis of tetraalkyl orthosilicate can result in gel formation and therefore care should be taken to avoid formation of gels if that result is not desirable.

Suitable tetraalkyl orthosilicates can include, for example, tetramethyl orthosilicate, tetraethyl orthosilicate, tetrapropyl orthosilicate and a combination thereof.

In further embodiments, the reaction mixture can comprise or consist essentially of medium to long chain trialkoxy silane, silane functional polymers and water. Suitable silane functional polymers can have at least one functional group that is a hydrolysable silane functional group of the formula Si—X; wherein X is an alkoxy group having from 1 to 4 carbon atoms, an aryloxy group having from 6 to 20 carbon atoms, an acyloxy group having from 2 to 6 carbon atoms, hydrogen, halogen, hydroxyl, amine, amide, imidazole, oxazolidinone, urea, carbamate and hydroxylamine. The hydrolysable silane functional group can be at the terminal ends of the polymer chain, part of the main polymer chain, it can be pendant to the main polymer chain or a combination thereof.

In some embodiments, the silane functional polymer can also comprise monomers that contain at least one hydroxyl functional group. The hydroxyl functional group can help to provide the organosilane condensate with crosslinkable functional groups that can interact with a crosslinking component (discussed below) to form a part of the crosslinked network of a layer of dried and cured coating composition and also provide for improved recoat adhesion.

Some suitable silane functional polymers can include, for example, silane functional polyacrylates; silane and hydroxyl functional polyacrylates; reaction products of oligomeric polyols of linear, star or branched aliphatic polyesters or polyethers with γ-isocyanatopropyltriethoxylsilane or γ-isocyanatopropyltrimethoxylsilane; hydrosilated vinyl containing oligomers or a combination thereof.

In still further embodiments, the reaction mixture can comprise or consist essentially of at least one medium to long chain trialkoxy silane, colloidal silica and water. The addition of colloidal silica can help to stabilize the organosilane condensates against flocculation and eventually settling out. It has been found that certain types of organosilane condensates, when formed without the presence of colloidal silica, can, over time, settle out. Formation of the organosilane condensates in the presence of colloidal silica reduces the settling out.

The amino silane can be a monoamine compound comprising primary, secondary, tertiary amine or a di-, tri- or higher amine compound comprising primary, secondary, tertiary amines or a combination thereof. In some embodiments, the amino silane can be a diamino silane, such as, for example, 3-(2-aminoethylamino)propyl trialkoxysilane. In other embodiments, the amino silane can be 3-(2-aminoethylamino) propylmethyldimethoxysilane, 3-(2-aminoethylamino) propyltrimethoxysilane, 3-aminopropyltrimethoxysilane, 3-aminopropyltriethoxysilane, bis(trimethoxypropyl)amine, tris(trimethoxypropyl)amine or a combination thereof.

In some embodiments, the amino silane can include a structure according to formula (5);

$$R^2N(R^3)(R^4) \qquad (5);$$

wherein $R^2$ is $R^5-Si(X)_n(R^6)_{3-n}$;
each of $R^3$ and $R^4$ is independently H, $R^2$ or a C1 to C6 alkyl optionally containing a primary, secondary or tertiary amine group;
$R^5$ is C1 to C6 alkyl;
$R^6$ is C1 to C6 alkyl;
X is C1 to C6 alkoxy; and
n is 1, 2 or 3.

In further embodiments, the process for forming the organosilane condensate comprises;
a) forming a reaction mixture comprising or consisting essentially of at least one medium to long chain trialkoxy silane, water and at least one amino silane;
b) stirring the reaction mixture until the desired organosilane condensate is formed.

In still further embodiments, the process for forming the organosilane condensates comprises;
a) forming a reaction mixture comprising or consisting essentially of at least one medium to long chain trialkoxy silane, water, any of the above mentioned additional reactants and at least one amino silane;
b) stirring the reaction mixture until the desired organosilane condensate is formed.

Any of the above mentioned "additional reactants" means that one or more of the at least one di-alkoxy or mono-alkoxy silane, the tetraalkyl orthosilicates, the silane functional polymers, colloidal silica or a combination thereof can be added to the reaction mixture of this process to form the desired organosilane condensate.

In addition to the reactants previously described, the hydrolysis reaction can optionally include at least one acid catalyst. Some suitable acid catalysts include aromatic sulfonic acids, such as, dodecylbenzene sulfonic acid, paratoluene sulfonic acid and dinonylnaphthalene sulfonic acid. Other acid catalysts that can be used include, for example, mineral acids, such as, hydrochloric acid, sulfuric acid, phosphoric acids; organic acids, such as, phenyl acid phosphate, benzoic acid; polymeric acid oligomers having pendant acid functional groups. Combinations of any of the above acid catalysts can also be used.

The organosilane condensates formed according to any of the previously described methods can readily be dispersed in coating compositions. These coating compositions can provide a layer of a dried and cured coating that has the organosilane condensates dispersed throughout the bulk of the coating, or, by varying the ratio of substituted to unsubstituted $R^1$ of the medium to long chain trialkoxy silane, a coating composition can be produced having organosilane condensates dispersed throughout the bulk material and also having a relatively higher concentration of the organosilane condensates at the surface.

For the purpose of determining the amount of organosilane condensate to add to a coating composition, it is assumed that all of the starting materials, with the exception of the optional acid catalysts and optional solvents, form the desired product. Depending upon the reaction conditions, reagent reactivities and various other factors the reaction may or may not approach 100 percent of the initial starting materials participating in the hydrolysis reaction. Reaction of all of the starting materials is irrelevant for the calculation of the amount of organosilane condensate added to the coating composition, as was stated previously, it is to be assumed that all of the starting materials, with the exception of the optional acid catalysts and optional solvents form the desired product.

In some embodiments, the addition of the disclosed organosilane condensates to a clearcoat composition can provide a layer of a dried and cured clearcoat that provides significantly higher scratch and mar resistance over that of a layer of a dried and cured clearcoat that does not contain the disclosed organosilane condensate. In other embodiments, the addition of the amino silane provides a organosilane condensate that provides improved scratch and mar resistance to a layer of a dried and cured clearcoat composition when compared to clearcoats comprising a organosilane condensate that can be formed without the amino silane.

Film-Forming Binder

The coating composition can comprise organosilane condensates and film-forming binder. In some embodiments, the coating composition can contain the organosilane condensate in the range of from 1 to 30 percent by weight based on the total weight of the film-forming binder. In other embodiments, the coating composition can contain the organosilane condensate in the range of from 1 to 20 percent by weight, based on the total weight of the film-forming binder. In other embodiments, the coating composition can contain the organosilane condensate in the range of from 2 to 10 percent by weight, based on the total weight of the film-forming binder. Typical coating compositions can include, in addition to the organosilane condensate and film-forming binder, solvents, pigments, rheology control agents, light stabilizers, UV absorbers, crosslinking catalysts and other additives.

The term "film-forming binder" means those components that form a part of the final crosslinked network. Other ingredients typically added to coating compositions that form a part of the dried layer, but do not become an integral part of the crosslinked network are not considered part of the film-forming binder. Also excluded in this definition are the added organosilane condensates formed by any of the previously described methods, even though, in some embodiments, the organosilane condensate can have functional groups that react with the crosslinkable component and can become a part of the crosslinked network.

The film-forming binder comprises or consists essentially of a crosslinkable component and a crosslinking component. The crosslinkable component can be a compound, oligomer and/or polymer having functional groups that are capable of reacting with functional groups on the crosslinking component to form a crosslinked network. The crosslinkable functional groups can include, for example, hydroxyl groups, amine groups, epoxy groups, carboxylic acid groups, anhydride groups, aspartate groups, acetoacetate groups, orthoester groups, thiol groups or a combination thereof. The crosslinking component can be a compound, oligomer and/or polymer that has functional groups that are capable of reacting with the functional groups of the crosslinkable component to form a crosslinked network. The crosslinking functional groups can include carboxylic acid groups, anhydride groups, isocyanate groups and blocked isocyanate groups. Melamine resins are also suitable as the crosslinkindcomponent. Combinations of any of the aforementioned crosslinking components can be used.

In one embodiment, the crosslinkable component is a compound, oligomer and/or polymer containing epoxy functional groups and the crosslinking component is a compound, oligomer and/or polymer containing carboxylic acid groups. These coatings are typically called "epoxy/acid" coating compositions and are well-known in the art. As used herein, the term "carboxylic acid groups" includes carboxylic acid and/or anhydride functional groups. In some embodiments, a single compound, oligomer and/or polymer can have both epoxy and carboxylic acid groups.

Typical crosslinkable components containing epoxy functional groups can be chosen from epoxy functional acrylic polymers, epoxy functional polyester polymers, epoxy functional polyethers, epoxy functional polyurethanes or a combination thereof. Such polymers can have epoxy equivalent weight in the range of from 100 to 2000 grams per mole. As used herein, epoxy equivalent weight means the weight of resin, in grams, that contains one equivalent of epoxy.

Typical polymers containing carboxylic acid groups can be chosen from acrylic polymers, polyester polymers, polyethers, polyurethanes or a combination thereof. Such polymers can have acid equivalent weights in the range of from 100 to 2000 grams per mole.

In other embodiments, the crosslinkable component comprises compounds, oligomers and/or polymers having crosslinkable groups such as, for example, hydroxyl groups, amine groups, carboxylic acid groups, anhydride groups, aspartate groups, acetoacetate groups, orthoester groups, thiol groups or a combination thereof and the crosslinking component comprises compounds, oligomers and/or polymers comprising isocyanate groups; blocked isocyanate groups; melamine resins or combinations thereof.

The compounds, oligomers and/or polymers having hydroxyl, amine, carboxylic acid, anhydride, aspartate, acetoacetoxy, orthoester and/or thiol groups are well-known in the art. Typical compounds, oligomers and/or polymers containing these groups can include, for example, polyacrylates, polyesters, polyethers, polyurethanes and combinations thereof.

The compounds, oligomers and/or polymers having crosslinkable groups are often referred to as the crosslinkable component of a film forming binder. For the crosslinkable groups to form a durable film, they must be reacted, or crosslinked, with a crosslinking component. Compounds, oligomers and/or polymers having isocyanate functional groups can function as the crosslinking component of the film forming binder.

Typical isocyanate crosslinking components include, for example, aliphatic, cycloaliphatic and aromatic polyisocyanates. Specific examples can include; 2,4-toluene diisocyanate, 2,6-toluene diisocyanate, 4,4-diphenylmethane diisocyanate, 4,4'-dicyclohexyl methane diisocyanate, 3,3'-dimethyl-4,4'-biphenyl diisocyanate, 1,4-benzene diisocyanate, 1,5-naphthalene diisocyanate, 1,6-hexamethylene diisocyanate (HDI), 4,6-xylene diisocyanate, isophorone diisocyanate (IPDI), 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-4,4'-dicyclohexylmethane diisocyanate, polyisocyanates having isocyanurate structural units, polyisocyanates having uretidione structural units, adducts of 3 molecules of diisocyanates and 1 molecule of water, allophanates, uretidiones, trimers and biurets, for example, of hexamethylene diisocyanate, allophanates, uretidiones, trimers and biurets, for example, of isophorone diisocyanate. 1,6-hexamethylene diisocyanate and isophorone diisocyanate and isocyanurates thereof are preferred because of their commercial availability. Tri-functional isocyanates also can be used, such as, triphenyl methane triisocyanate, 1,3,5-benzene triisocyanate, 2,4,6- toluene triisocyanate. Trimers of diisocyanates, such as, the trimer of hexamethylene diisocyanate, sold as TOLONATE® HDT from Rhodia Corporation and the trimer of isophorone diisocyanate are also suitable. Combinations of any of the mentioned polyisocyanates are also useful. The use of aromatic polyisocyanates in coating compositions can lead to a yellowing of the coating over time. Therefore, the use of aromatic polyisocyanates should be carefully considered when the coating composition is to be used as a clearcoat composition.

In some embodiments, the crosslinking component is hexamethylene diisocyanate, isophorone diisocyanate, isocyanurates of hexamethylene diisocyanate, allophanates of hexamethylene diisocyanate, biurets of hexamethylene diisocyanate, uretidiones of hexamethylene diisocyanate, isocyanurates of isophorone diisocyanate, allophanates of isophorone diisocyanate, biurets of isophorone diisocyanate, uretidiones of isophorone diisocyanate or a combination thereof.

Any of the above polyisocyanates can optionally be blocked with known blocking agents, according to known methods to form blocked polyisocyanates. Such blocked polyisocyanates can be used as the crosslinking component in a coating composition containing the organosilane condensate.

Melamine resin crosslinking components are generally fully or partially alkylated melamine formaldehyde compounds and may be monomeric or polymeric or mixtures thereof. Some of the suitable melamines include melamines which contain, on average, three or more methylol groups etherized with monohydric alcohols having from 1 to 5 carbon atoms, such as, for example, methanol, n-butanol, or isobutanol per triazine nucleus.

Many suitable melamines are commercially available and can include alkylated melamines, such as, methylated, butylated, isobutylated melamines and mixtures thereof. Suitable melamine resins are available from Cytec Industries Inc., West Patterson, N.J., and from Ineos Melamines, Marietta, Georgia.

If desired, appropriate catalysts may also be included to accelerate the crosslinking process of the coating composition.

When the coating compositions include a polyisocyanate or a blocked polyisocyanate as the crosslinking agent, the coating composition preferably includes a catalytically active amount of one or more tin or tertiary amine catalysts for accelerating the curing process. Generally, the catalytically active amount of the catalyst in the coating composition ranges from about 0.001 percent to about 5 percent, preferably ranges from 0.005 percent to 2 percent, more preferably, ranges from 0.01 percent to 1 percent, all in weight percent based on the weight of the film-forming binder. A wide variety of catalysts can be used, such as, tin compounds, including dibutyl tin dilaurate and dibutyl tin diacetate; tertiary amines, such as, triethylenediamine. These catalysts can be used alone or in conjunction with carboxylic acids, such as, acetic acid. One of the commercially available catalysts, sold under the trademark, FASTCAT®4202 dibutyl tin dilaurate by Arkema, Inc. Philadelphia, Pa., is particularly suitable.

When the coating compositions include melamine as the crosslinking agent, it also preferably includes a catalytically active amount of one or more acid catalysts to further enhance the crosslinking of the components on curing. Generally, a catalytically active amount of the acid catalyst in the coating composition ranges from about 0.1 percent to about 5 percent, preferably ranges from 0.1 percent to 2 percent, more preferably ranges from 0.5 percent to 1.2 percent, all in weight percent based on the weight of the film-forming binder. Some suitable acid catalysts include aromatic sulfonic acids, such as, dodecylbenzene sulfonic acid, para-toluenesulfonic acid and dinonylnaphthalene sulfonic acid, all of which are either unblocked or blocked with an amine, such as, for example, dimethyl oxazolidine and 2-amino-2-methyl-1-propanol, N,N-dimethylethanolamine or a combination thereof. Other acid catalysts that can be used, such as phosphoric acids, more particularly, phenyl acid phosphate, benzoic acid, oligomers having pendant acid groups, all of which may be unblocked or blocked with an amine.

Coating compositions comprising the organosilane condensates can be formed by any of the known methods. In one embodiment, a clearcoat composition can be formed by mixing together all of the ingredients of the coating composition except for the organosilane condensate. Following the mixing of all of these ingredients, the organosilane condensate can be added and mixed to form the coating composition. In another embodiment, the organosilane condensate can be mixed together with all of the ingredients to form the coating composition. In a further embodiment, especially in the case of the crosslinking component being an unblocked polyisocyanate, the organosilane condensate can be mixed with one or the other or both of the separate crosslinking and crosslinkable components. The separate crosslinking and crosslinkable components can then be mixed just prior to using to form a "pot mix" that can be applied to the substrate.

Optionally, moisture scavengers can be added to the coating compositions containing the organosilane condensates. In some embodiments, the moisture scavenger can be, for example, trimethyl orthoacetate, triethyl orthoacetate or a combination thereof. Other moisture scavengers are known in the art and may be used.

The coating composition can comprise an organic solvent or blend of solvents. The selection of organic solvent depends upon the requirements of the specific end use application of the coating composition, such as, for example, the VOC emission requirements, the selected pigments, film forming binder and crosslinking agents.

Representative examples of organic solvents which can be useful herein include alcohols, such as, methanol, ethanol, n-propanol, isopropanol and butanol; ketones, such as, acetone, butanone, pentanone, hexanone, and methyl ethyl ketone, methyl isobutyl ketone, diisobutyl ketone, methyl amyl ketone; alkyl esters of acetic, propionic, and butyric acids, such as, ethyl acetate, butyl acetate, and amyl acetate; ethers, such as, tetrahydrofuran, diethyl ether, and ethylene glycol and polyethylene glycol monoalkyl and dialkyl ethers, such as, cellosolves and carbitols; and glycols, such as, ethylene glycol and propylene glycol and mixtures thereof, and aromatic hydrocarbon solvents, such as, xylene, toluene.

To improve weatherability of the composition about 0.1-10% by weight, based on the weight of the film forming binder, of ultraviolet light stabilizers, screeners and antioxidants'can be added. Typical ultraviolet light screeners and stabilizers include the following:

Benzophenones, such as, for example, hydroxy dodecyloxy benzophenone, 2,4-dihydroxy benzophenone, hydroxy benzophenones containing sulfonic acid groups or combinations thereof.

Benzoates, such as, for example, dibenzoate of diphenylol propane, tertiary butyl benzoate of diphenylol propane or combinations thereof.

Triazines, such as, for example, 3,5-dialkyl-4-hydroxyphenyl derivatives of triazine, sulfur containing derivatives of dialkyl-4-hydroxy phenyl triazine, hydroxy phenyl-1,3,5-triazine or combinations thereof.

Triazoles, such as, for example, 2-phenyl-4-(2,2'-dihydroxy benzoyl)-triazole, substituted benzotriazoles such as, for example, hydroxy-phenyltriazole or combinations thereof.

Hindered amines, such as, for example, bis(1,2,2,6,6 pentamethyl-4-piperidinyl sebacate), di[4(2,2,6,6-tetramethyl piperidinyl)]sebacate or combinations thereof; and mixtures of any of the above.

Generally, rheology control agents can be used in the composition in amounts of about 0.1-5% by weight, based on the weight of the film forming binder, such as, for example, polyacrylic acid, polyalkylacrylates, polyether modified dimethyl polysiloxane copolymer, polyester modified polydimethyl siloxane or a combination thereof.

In one embodiment, the coating composition comprising the organosilane condensate is used as a clearcoat in automotive finishing and in refinishing vehicles. Small amounts of pigments may be added to a clearcoat composition to tint the clearcoat and provide enhanced aesthetic effects. In other embodiments, the coating composition can contain pigments to provide a mono coat, basecoat, sealer coat, primer, primer surfacer or other pigmented coating composition. Pigments can be added to the coating composition in a pigment to film-forming binder ratio of about 0.1:100 to 300:100 as are commonly used for the aforementioned compositions. Pigments typically are formulated into mill bases compatible with the coating composition and are added in the desired amount. Pigments used are those that are typically used for the aforementioned compositions and are well known to those skilled in the art.

In some embodiments, the coating composition can be prepared as a "one-pack coating composition" which means a curable coating composition having both the crosslinkable component and the crosslinking agent stored together in one pack. One-pack coating compositions are applied to a suitable substrate and are typically cured at elevated temperatures to form a durable coating.

In other embodiments, the coating composition can be prepared as a "two-component" or "two-pack" coating compositions, wherein the crosslinkable components and the crosslinking agents are stored in separate containers, which are typically sealed. The catalyst, organic solvent, and usual other additives may be added to either or both the crosslinkable or crosslinking agents, depending upon the intended use of the composition. However, these additives (except for some solvent) are preferably added to and stored in the same container with the crosslinkable component. The contents of the component containers are mixed in the desired ratio just prior to use to form the activated coating composition, which has a limited pot life. Mixing is usually accomplished simply by stirring at room temperature just before application. The coating composition is then applied as a layer of desired thickness on a substrate surface, such as an autobody. After application, the layer dries and cures at ambient or elevated temperatures to form a coating on the substrate surface having the desired coating properties.

In the application of the coating composition as a clearcoat to a vehicle such as an automotive or a truck, a basecoat which may be either a solventborne composition or a waterborne composition is first applied and then dried to remove at least a portion of the solvent or water before the clearcoat is applied, usually wet-on-wet by conventional spraying. When the applied basecoat composition is a waterborne basecoat composition, the drying step should remove at least 75% of the water from the applied layer. Electrostatic spraying also may be used. In refinish applications, the composition is preferably dried and cured at ambient temperatures but can be forced dried and cured in paint booths equipped with heat sources at slightly elevated booth temperatures of, in general, about 30 to 100° C., preferably, about 35 to 65° C., for a short time of about 3 to 30 minutes, preferably about 5-15 minutes. In an Original Equipment Manufacturer setting, the applied layer of clearcoat composition can be cured in an oven at temperatures in the range of from 100° C. to 160° C. The coating so formed is typically about 0.5-5 mils thick.

Another embodiment of the disclosure is a substrate coated by a layer of a dried and cured coating composition wherein the coating composition comprises A) an organosilane condensate; and B) a film-forming binder.

The method for producing a layer of a coating composition on a substrate wherein the method comprises the steps;
  i) applying to the substrate a layer of a coating composition, wherein the coating composition comprises; A) an organosilane condensate; and B) a film-forming binder; and
  ii) curing the applied coating composition.

Preferred substrates are automotive vehicle (or automobile) bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, boats, and aircraft. The substrate further includes industrial and commercial new construction and maintenance thereof; cement and wood floors; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods (including uni-, bi-, tri-, and motorcycles); and sporting equipment.

EXAMPLES

The chemicals used herein are available from the Aldrich Chemical Company, unless otherwise noted.

VAZO® 67 initiator, available from DuPont, Wilmington, Del.

KC-89S® methylmethoxy polysiloxane is available from Shin-Etsu Silicones of America, Inc., Akron, Ohio IPA-ST® colloidal silica is available from Nissan Chemical Industries, Ltd., Houston, Tex.

EXXSOL® D-3135 petroleum naphtha is available from ExxonMobil, Houston, Tex.

EXXSOL® D40 mineral spirits is available from ExxonMobil, Houston, Tex.

RESIMENE® 717 and 755 melamines are available from INEOS Melamines, Inc., Marietta, Ga.

CYMEL® 1168 monomeric melamine supplied by Cytec Industries Inc., West Patterson, N.J.

TINUVIN® 123 and 928 light stabilizers are supplied by Ciba Specialty Chemicals, Tarrytown, N.Y.

Dodecyl benzene sulfonic acid and the 2-amino-2-methyl-1-propanol salt of dodecyl benzene sulfonic acid are supplied by King Industries, Norwalk, Conn. under the NACURE® brand name.

DISPARLON® LC-955 flow aid supplied by King Industries, Norwalk, Conn.

Trimethyl orthoacetate and butanol are supplied by Chem Central, Bedford Park, Ill.

SOLVESSO® 100 and AROMATIC® 100 hydrocarbon fluid is available from ExxonMobil, Houston, Tex.

The following abbreviations are used herein
HPA —Hydroxypropyl acrylate
HEMA —2-hydroxyethyl methacrylate
MAPTS —Methacryloxypropyl trimethoxy silane
Sty —Styrene
IBMA —Isobutyl methacrylate
BA —Butyl acrylate
BMA —Butyl methacrylate
EHA —2-Ethyl hexyl acrylate Preparation of Acrylic Hydroxy Functional Silane Polymers 1 and 2

Silane polymers 1 and 2 were prepared by copolymerizing in the presence of a 2/1 SOLVESSO® 100 aromatic solvent/butanol mixture, the monomer mixtures described in Table 1 in the presence of 8 parts by weight of VAZO® 67 initiator. The resulting polymer solution has a 70% solids content and a viscosity of F—R on the Gardner Holdt scale measured at 25° C. and the polymers have a weight average molecular weight of approximately 4,500 gram/mole. All amounts in Table 1 are parts by weight.

TABLE 1

|  | Silane Polymer 1 | Silane Polymer 2 |
|---|---|---|
| HPA | 20 |  |
| HEMA |  | 31.5 |
| MAPTS | 30 | 10 |
| Sty | 25 | 20 |
| IBMA | 23 |  |
| BA | 2 |  |
| BMA |  | 25.9 |
| EHA |  | 12.6 |

Preparation of Organosilane Condensates 1-8

Preparation of Comparative Organosilane Condensate 1

6 grams of butyl acetate, 15 grams of propyltrimethoxysilane, 15 grams of tetraethyl orthosilicate, 15 grams of silane polymer 2, 6.6 grams of deionized water and 0.36 grams of dodecylbenzylsulfonic acid were added to a flask with stirring. The mixture was stirred for several minutes until a clear solution was formed. The mixture was then stirred at 60° C. for 15 hours. GPC analysis showed a Mn=2913 and polydispersity of 3.79.

Preparation of Organosilane Condensate 2

6 grams of butyl acetate, 15 grams of propyltrimethoxysilane, 15 grams of tetraethyl orthosilicate, 15 grams of silane polymer 2, 6.6 grams of deionized water and 0.36 grams of dodecylbenzylsulfonic acid were added to a flask with stirring. The mixture was stirred for several minutes until a clear solution was formed. 0.18 gram of 3-(2-aminoethylamino)propyl trimethoxysilane was added with mixing. The mixture was then stirred at 60° C. for 15 hours. GPC analysis for the resultant condensate showed a Mn=2115 and polydispersity of 4.28.

Preparation of Organoilane Condensate 3

6 grams of butyl acetate, 15 grams of propyltrimethoxysilane, 15 grams of tetraethyl orthosilicate, 15 grams of silane polymer 2, 6.6 grams of deionized water and 0.36 grams of dodecylbenzylsulfonic acid were added to a flask with stirring. The mixture was stirred for several minutes until a clear solution was formed. 0.27 gram of 3-(2-aminoethylamino)propyl trimethoxysilane was added with mixing. The mixture was then stirred at 60° C. for 15 hours. GPC analysis for the resultant condensate showed a Mn=2063 and polydispersity of 5.01.

Preparation of Organosilane Condensate 4

7.7 grams of propyltrimethoxysilane, 25.9 grams of gamma-glycidoxypropyltrimethoxysilane, 7 grams of deionized water, 16.3 grams of tetraethyl orthosilicate and 0.36 grams of dodecylbenzylsulfonic acid were added to a flask with stirring. The mixture was stirred for several minutes until a clear solution was formed. The mixture was then stirred at 60° C. for 15 hours. To the above mixture, 7.5 grams of gamma-glycidoxypropyltrimethoxysilane were added and continued to stir for another 15 h at 60° C. GPC analysis for the resultant condensate showed a Mn=1018 and polydispersity of 1.81.

Preparation of Organosilane Condensate 5

9 grams of tetraethyl orthosilicate, 3.9 grams of gamma-glycidoxypropyltrimethoxysilane, 7.71 grams of deionized water and 0.36 grams of dodecylbenzylsulfonic acid were added to a flask with stirring. The mixture was stirred for several minutes until a clear solution was formed. To this mixture, 6.93 grams of propyltrimethoxysilane and 19.5 grams of gamma-glycidoxypropyltrimethoxysilane were added and the mixture was further stirred for 5-10 minutes at RT. 0.09 gram of 3-(2-aminoethylamino)propyl trimethoxysilane was finally added with mixing at 60° C. for 15 hours. GPC analysis for the resultant condensate showed a Mn=2946 and polydispersity of 1.99.

Preparation of Non-aqueous Dispersion (NAD)

To a 5-liter flask equipped with an agitator, thermometer, condenser, nitrogen inlet and addition funnels was added 206 parts of a random copolymer comprising styrene/butyl acrylate/butyl methacrylate/2-hydroxy ethyl acrylate/methacrylic acid/glycidyl methacrylate (14.7/43.6/27.5/10.1/2.3/1.7, in parts by weight), 12 parts of isopropanol, 94 parts of mineral spirits, 53 parts of heptane and 3 parts of butanol. The random copolymer was 63.5% by weight in toluene having a weight average molecular weight of 8100. The mixture was agitated under a nitrogen atmosphere and was heated to reflux (100° C. to 104° C.). A mixture of 0.5 parts t-butyl peroctoate in 5 parts mineral spirits was added all at once. A mixture of 52 parts styrene, 86 parts of 2-hydroxy ethyl acrylate, 126 parts methyl methacrylate, 5 parts of glycidyl methacrylate, 14 parts methacrylic acid, 62 parts methyl acrylate and 103 parts of the previously described random copolymer was added to the refluxing mixture over a 210 minute period. When the addition was complete, a mixture of 12 parts butanol, 17 parts heptane, 5 parts t-butyl peroctoate and 31 parts mineral spirits was added and the mixture was refluxed for 45 minutes. A mixture of 1.7 parts t-butyl peroctoate in 16 parts of butanol was then added over a 30 minute period and the reaction was held for 60 minutes. Finally, the reactor was stripped of 76 parts of solvent. The reaction had a room temperature viscosity of 2000 centipoise at 5 rpm on a Brookfield viscometer and a weight solids of 63.5 percent.

Clearcoat Composition

Preparation of Clearcoat Composition

The following Clearcoat Composition was prepared by blending together the following ingredients in the order given. All ingredients amounts are in parts by weight.

TABLE 2

| Ingredient | Amount |
|---|---|
| CYMEL ® 1168 | 97 |
| RESIMENE ® 717 | 36 |
| TINUVIN ® 123 | 5.6 |
| TINUVIN ® 928 | 11 |
| NAD | 222 |
| Catalyst[1] | 14 |
| DISPARLON ® LC-955 | 6 |
| Trimethyl orthoacetate | 15 |
| Silane Polymer 1 | 383 |
| Butanol | 50 |

[1]Dodecylbenzene sulfonic acid salt of 2-amino-2-methyl-1-propanol.

Preparation of Comparative Clearcoat 1 and Clearcoats 2 and 3 Comparative Clearcoat 1 and Clearcoat Examples 2 and 3 were prepared by mixing 190 grams of the clearcoat common with the ingredients shown in Table 3. All amounts in table 3 are in grams.

TABLE 3

| | Comparative Clearcoat 1 | Comparative Clearcoat 2 | Clearcoat 3 |
|---|---|---|---|
| Clearcoat Composition | 190 | 190 | 190 |
| Silane Polymer 1 | 10 | | |
| Comparative Organosilane Condensate 1 | | 15 | |
| Organosilane Condensate 2 | | | 15 |

Each of the above coating examples were reduced to a spray viscosity with conventional solvents and each was hand sprayed to a thickness of about 50 microns onto a panel coated with a solvent-borne black base-coat over a steel substrate which was already coated with a layer each of electrocoat and primer surfacer. The solvent-borne basecoat is an Ebony basecoat commercially available from DuPont under DuPont Code of 648A01175. The primer surfacer used is commercially available from DuPont under DuPont Code of 554-DN082. The electrocoat used is commercially available from DuPont under the name of ED5050.

The basecoats were applied in two coats by hand with a 60 second flash period between the first and the second coat over a primed, electrocoated steel substrate. The spray booth conditions were 24° C. and 50% humidity. After a 5-minute flash at ambient condition, two layers of the clearcoat compositions were spray applied with a 30 second flash between the first and the second clearcoat application. The booth conditions remained the same. The clearcoats were further flashed for 30 minutes and then baked in an oven for 20 minutes at 140° C.

For scratch and mar resistance tests, the panels were allowed to age for at least 24 hours. Crockmeter mar test with its scratch tip wrapped with either a 2-micron or 9-micron 3M scratch paper were scratched on the coating surface for 10 double rubs. The gloss retention of mar resistance were recorded as a percentage of 20° gloss in marred area divided by the 20° gloss in the un-marred area.

The data is summarized in Table 4.

TABLE 4

| | 20° Gloss | Crockmeter-2 micron | Crockmeter-9 micron |
|---|---|---|---|
| Comparative Clearcoat 1 | 88 | 95% | 76% |
| Comparative Clearcoat 2 | 88 | 98% | 84% |
| Clearcoat 3 | 88 | 99% | 94% |

As Table 10 shows, both clearcoat 2 and 3 showed significant improvement of mar resistance over the control. However, Clearcoat 3 which added the organosilane condensate of the invention showed the most significant improvement of mar resistance.

Comparative Clearcoat Example 4 and Clearcoat Examples 5 and 6

A two-component isocyanate clearcoat (IMRON® ES clearcoat, commercially available from DuPont, Wilmington, Del.) was reduced with 4% wt of 1/1 mixture of AROMATIC® 100 (1/1 mix of AROMATIC® 100 and ethyl-3-ethoxy propionate) and used as a control clear. To component A of this 2K clear was added organosilane condensates to make the clear compositions described in Table 5.

TABLE 5

| | Comparative Clearcoat 4 | Comparative Clearcoat 5 | Clearcoat 6 | Clearcoat 7 |
|---|---|---|---|---|
| Component A | 150 | 135 | 135 | 135 |
| Comparative Organosilane Condensate 1 | | 9 | | |
| Organosilane Condensate 2 | | | 9 | |
| Organosilane Condensate 3 | | | | 9 |
| Component B | 50 | 50 | 50 | 50 |

The component A and B of each of the above clear coatings were mixed and hand sprayed to a coating thickness of about 50 microns onto separate steel panels coated with a waterborne black base-coat (under DuPont Code of 562S61222) over a steel substrate which was already coated with a layer each of electro-coat and primer surfacer both described in Comparative Clearcoat 1 and Clearcoats 2 and 3.

The basecoats were applied in two coats by hand with a 60 second flash period between the first and the second coat over a primed, electrocoated steel substrate. The spray booth conditions were 24° C. and 65% humidity. After a 5-minute heated flash at 70° C., following the second basecoat application, two layers of the clearcoat compositions with a 30 second flash between the first and the second clearcoat application. The booth conditions remained the same. The clearcoats were further flashed for 10 minutes and then baked in an oven for 20 minutes at 140° C.

All the samples were tested for crockmeter-2 micron and 9 micron mar resistance by methods described in coating example A.

The data is summarized in Table 6.

TABLE 6

| Clearcoat Example | 20° Gloss | Crockmeter-2 micron | Crockmeter-9 micron |
|---|---|---|---|
| Comparative Clearcoat 4 | 87 | 79% | 20% |
| Comparative Clearcoat 5 | 86 | 79% | 26% |
| Clearcoat 6 | 87 | 87% | 49% |
| Clearcoat 7 | 87 | 91% | 69% |

Both Clearcoats 6 and 7 showed significant improvement of mar resistance over control Comparative Clearcoat 4.

Comparative Clearcoat Examples 8 and Clearcoat Examples 9-10

An epoxy-acid based clearcoat (Kino 1200th clearcoat, RK-8139, commercially available from DuPont, Wilmington, Del.) was reduced with 10% wt of 1/1 mixture of AROMATIC® 100 and dibasic ester-DBE (from Invista Inc.) and used as a control clear. To this epoxy-acid control clear was added the epoxy-functional silane condensate to make the clear compositions described in Table 7.

TABLE 7

| | Comparative Clearcoat 8 | Clearcoat 9 | Clearcoat 10 |
|---|---|---|---|
| Epoxy-Acid Control | 170 | 170 | 170 |
| Organosilane Condensate 4 | | 24 | |
| Organosilane Condensate 5 | | | 24 |

Each of the above clear coatings was hand sprayed to a coating thickness of about 50 microns onto separate steel panels coated with a waterborne black base-coat (under Dupont code of TW710 black, commercially available from DuPont) over a steel substrate which was already coated with a layer each of electro-coat and primer surfacer both described in coating example A.

The basecoats were applied in two coats by hand with a 60 second flash period between the first and the second coat over a primed, electrocoated steel substrate. The spray booth conditions were 24° C. and 65% humidity. After a 5-minute heated flash at 70° C., following the second basecoat application, two layers of the clearcoat compositions with a 30 second flash between the first and the second clearcoat application. The booth conditions remained the same. The clearcoats were further flashed for 10 minutes and then baked in an oven for 20 minutes at 140° C.

All the samples were tested for crockmeter-2 micron and 9 micron mar resistance by methods described in coating example A.

The data is summarized in Table 8.

TABLE 8

| Clearcoat Example | 20° Gloss | Crockmeter-2 micron | Crockmeter-9 micron |
|---|---|---|---|
| Comparative Clearcoat 8 | 87 | 67% | 18% |
| Clearcoat 9 | 86 | 83% | 43% |
| Clearcoat 10 | 86 | 81% | 41% |

Both Clearcoats 9 and 10, containing the disclosed organosilane condensates showed significant improvement of mar resistance over Comparative Clearcoat 8.

What is claimed is:

1. A solvent-based coating composition comprising:
A) a pre-formed organosilane condensate,
   wherein the pre-formed organosilane condensate consists of a reaction product that is formed by hydrolysis of a reaction mixture that consists of mixture ingredients (1) - (6) as follows:
   (1) a medium to long chain trialkoxy silane selected from the group consisting of:
   propyltrimethoxysilane and gamma-glycidoxypropyltrimethoxysilane, and combinations thereof,
   (2) water and optionally one or more solvents,
   (3) about 0.03 percent to about 1 percent by weight, based on total weight of the medium to long chain trialkoxy silane, of 3-(2-aminoethylamino)propyl trialkoxysilane,
   (4) at least one silicon-containing additional reactant compound including at least a tetraalkyl orthosilicate and optionally one or more of: at least one di-alkoxy or mono-alkoxy silane, silane functional polymers, and colloidal silica,
   (5) at least one acid catalyst, and
   (6) optionally a further medium to long chain trialkoxy silane according to the formula: $(RO)_3-Si-R^1$, wherein $R^1$ is an unsubstituted alkyl group having 3 to 20 carbon atoms, wherein the hydrolysis reaction is carried out by stirring the reaction mixture for more than two minutes up to 24 hours at a temperature of from 30° C. to 90° C.;
B) a film-forming binder that is different from the pre-formed organosilane condensate, wherein the pre-formed organosilane condensate is present in an amount of from 1% to 30% by total weight of the film-forming binder;
C) optionally one or more of moisture scavengers, UV stabilizers or screeners present in an amount of about 0.1% to 10% by total weight of the film-forming binder, pigments, and rheology control agents; and
D) at least one organic solvent in addition to the optional one or more solvents of component A(1).

2. The coating composition of claim 1 wherein the film-forming binder comprises a crosslinkable component and a crosslinking component;
   wherein the crosslinkable component is a compound, oligomer and/or polymer comprising one or more functional groups selected from the group consisting of hydroxyl groups, amine groups, epoxy groups, carboxylic acid groups, anhydride groups, aspartate groups, acetoacetate groups, orthoester groups, thiol groups and a combination thereof; and
   wherein the crosslinking component is a compound, oligomer and/or polymer comprising one or more of carboxylic acid groups, anhydride groups, isocyanate groups, blocked isocyanate groups or wherein the crosslinking component is a melamine resin or wherein the crosslinking component comprises combinations thereof.

3. The coating composition of claim 1 wherein the coating composition is a clearcoat composition.

4. The coating composition of claim 1, wherein the pre-formed organosilane condensate has a number average molecular weight ($M_n$) of about 800 to 2946.

5. The coating composition of claim 1, wherein the pre-formed organosilane condensate comprises particles with an average particle size of 1 nanometer to 6 microns.

6. The coating composition of claim 1, wherein the pre-formed organosilane condensate has a polydispersity of 1.81 to 5.01.

\* \* \* \* \*